UNITED STATES PATENT OFFICE.

SETH K. DEVEREUX, OF CASTINE, MAINE.

METHOD OF PRODUCING DESIGNS UPON WOOD.

SPECIFICATION forming part of Reissued Letters Patent No. 9,553, dated February 8, 1881.

Original No. 230,407, dated July 27, 1880. Application for reissue filed September 29, 1880.

*To all whom it may concern:*

Be it known that I, SETH K. DEVEREUX, of Castine, in the county of Hancock and State of Maine, have invented a new and Improved Method of Producing Pictures and Designs upon Wood, of which the following is a specification.

The old methods of producing pictures, &c., upon wooden surfaces are, painting with a brush and other means familiar to the public.

My method is as follows: I take a piece of wood having a smooth surface—preferably a piece which has been "filled" and polished—and produce indentations upon its surface. These indentations are produced by means of tools having sharp cutting-edges, said tools being struck by a perpendicular blow from a hammer or like instrument, thus cutting the fiber of the wood. Having produced by the above means the desired design, picture, or letter upon or in the wood, I fill each indentation with gold-leaf or coloring-matter of any kind without placing any upon the unindented portion of the wood. Suppose, for example, I have a landscape view to reproduce on a wooden surface, I use a variety of metallic tools, each of which is provided with one or more sharp cutting-edges. One tool produces a leaf, another is used in producing a hedge, another for grass, another for a window in a house, &c. In each case the blow struck upon the tool is strong enough to cut the fiber of the wood, not to merely impress it. In the latter case the action of the atmosphere would be likely to obliterate the impression. In the former case the indentation is permanent.

There are many articles of furniture, &c., upon which my method of producing pictures, &c., may be used—the head-boards of bedsteads, sideboards, tops and edges of tables, brackets, panels, interiors of parlor-cars, &c.

It is to be borne in mind that my method is entirely distinct from the art of engraving on wood, in which clean lines are cut by drawing the gravers' tools, and where, of course, no gold-filling is found.

I am aware that in ornamenting book-covers heated tools are stamped upon the covers and gold-leaf afterward applied, printers' type being often used for the marking-point; and I am also aware that wood has been ornamented by indenting letters or figures in the wood and then gilding or painting the sunken letters, as shown in Letters Patent of the United States numbered 201,252, granted March 12, 1878. I therefore do not claim, broadly, the application of gilt or coloring-matter to sunken surfaces.

Having thus fully described my invention, what I claim, and desire to secure by Letters Patent, is—

1. The method of producing pictures, &c., on wood hereinbefore described, which consists in producing the outlines of the picture, design, letter, or figure desired by successive indentations with a sharp instrument, and then applying leaf or coloring material to the indentations, in the manner described.

2. The method of producing pictures, &c., on wood hereinbefore described, which consists in producing the outlines of the picture, design, letter, or figure desired by successive indentations, which cut the fiber of the wood, by means of a sharp instrument, and then applying leaf or coloring material to the indentations, in the manner described.

SETH K. DEVEREUX.

Witnesses:
WESLEY VANWART,
JAMES A. VANWART.